United States Patent [19]
Collins et al.

[11] Patent Number: 4,804,158
[45] Date of Patent: Feb. 14, 1989

[54] INSULATED PIPE ANCHOR APPARATUS

[75] Inventors: Seymour Collins; William F. McClellan, both of Vacaville, Calif.

[73] Assignee: Pipe Shields, Inc., Vacaville, Calif.

[21] Appl. No.: 77,581

[22] Filed: Jul. 24, 1987

Related U.S. Application Data

[63] Continuation-in-part of Ser. No. 875,285, Jun. 17, 1986, abandoned.

[51] Int. Cl.⁴ ............................................. F16L 3/16
[52] U.S. Cl. ................................................. 248/74.4
[58] Field of Search ........................ 248/74.1, 74.4, 62, 248/73, 55, 67.5, 635, 63; 174/163 R, 154, 156, 155, 157; 138/106, 107

[56] References Cited

U.S. PATENT DOCUMENTS

| | | | |
|---|---|---|---|
| 3,122,346 | 2/1964 | Seiler | 248/62 |
| 3,539,137 | 11/1970 | March | 138/107 X |
| 3,891,006 | 6/1975 | Lee | 138/106 |
| 3,987,991 | 10/1976 | Keever et al. | 138/106 X |
| 4,323,088 | 4/1982 | McClellan | 248/62 X |
| 4,530,478 | 7/1985 | McClellan | 248/55 X |
| 4,640,480 | 2/1987 | Semedard et al. | 248/65 |
| 4,679,755 | 7/1987 | Marsault et al. | 248/65 X |
| 4,714,229 | 12/1987 | Force et al. | 248/62 X |

*Primary Examiner*—Ramon S. Britts
*Assistant Examiner*—Karen J. Chotkowski
*Attorney, Agent, or Firm*—Thomas E. Schatzel

[57] ABSTRACT

An insulated pipe anchor apparatus including an external frame, an internal insulating structure insert and a plurality of thrust plates. The apparatus fits concentrically around a pipe and can be anchored to a piece of structural steel. Positive restraint to axial, lateral and vertical pipe movement is provided by the interaction of the external frame and thrust plates with the internal structural insert. An alternate embodiment incorporates thrust plates to also provide positive restraint to rotational pipe movement.

26 Claims, 5 Drawing Sheets

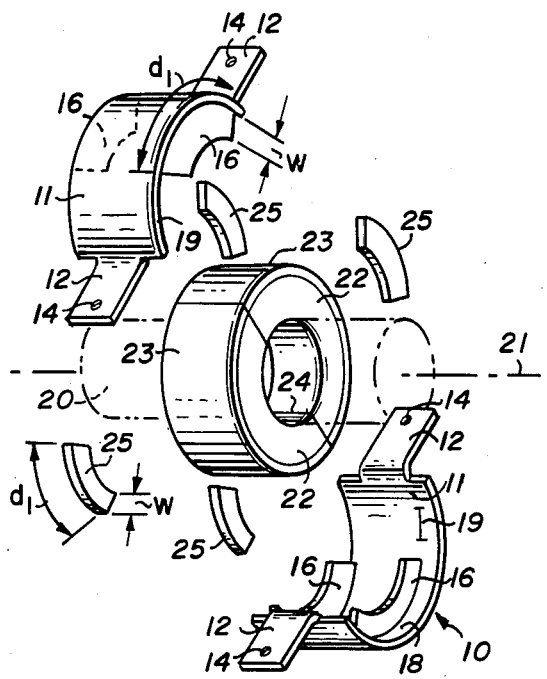
Fig_1
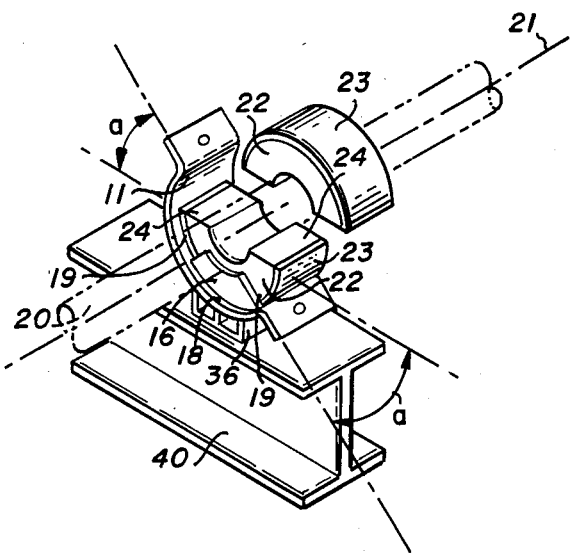
Fig_2
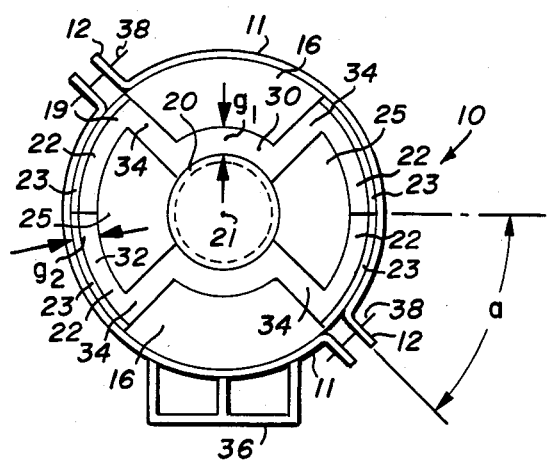
Fig_3
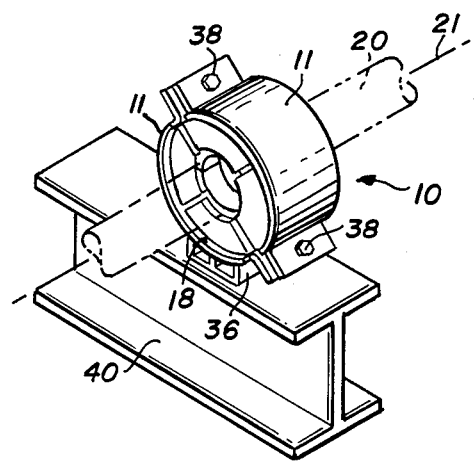
Fig_4

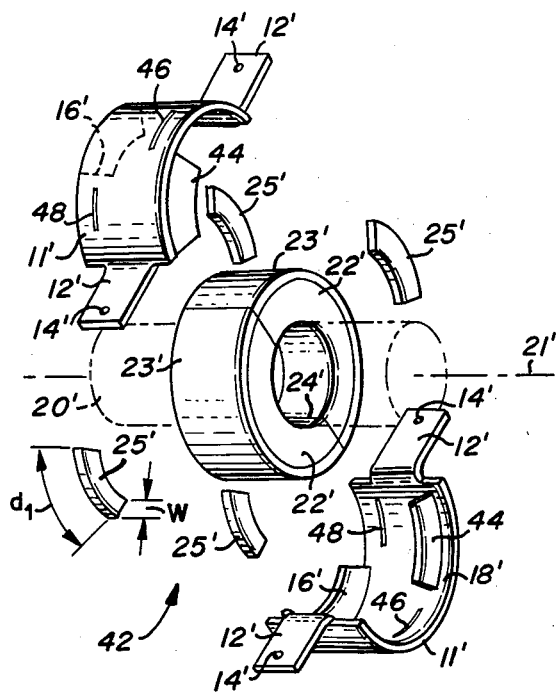
Fig_4A

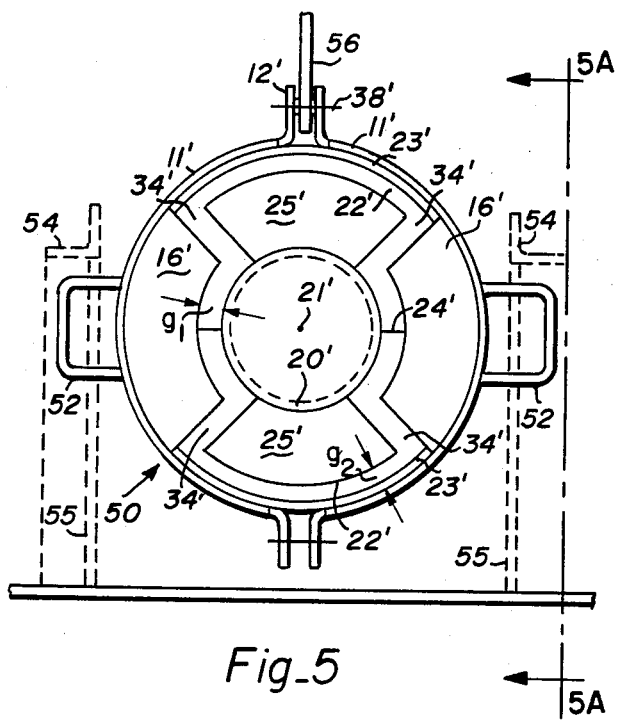
Fig_5
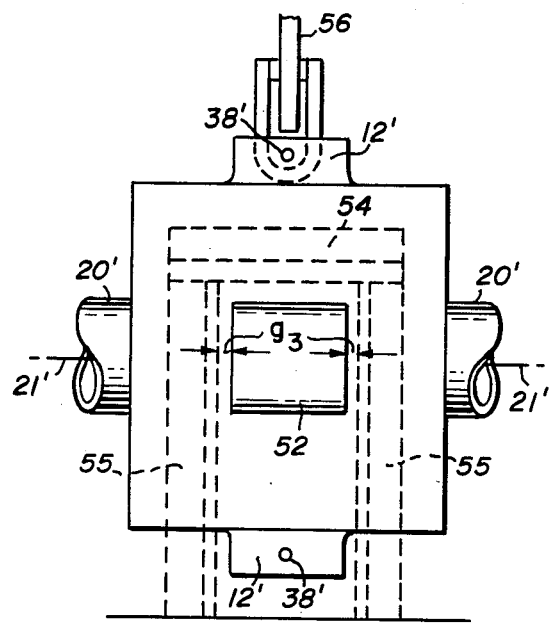
Fig_5A
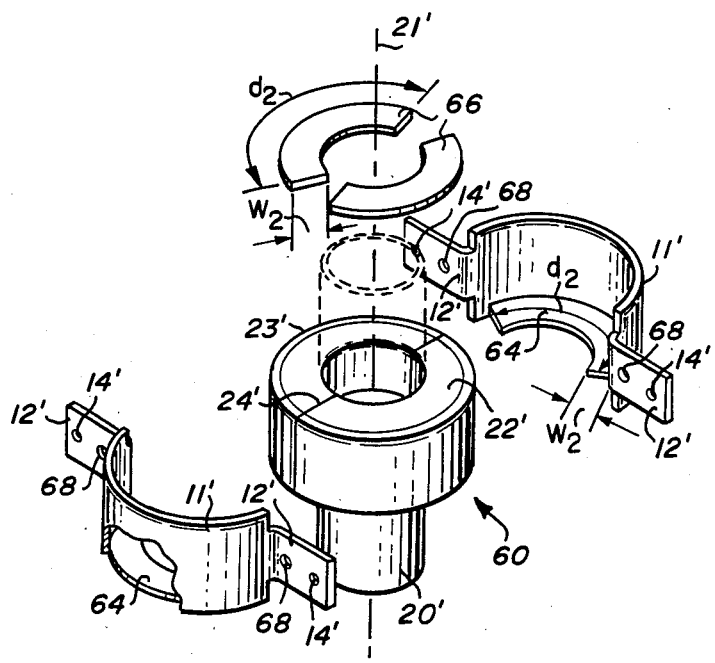
Fig_6

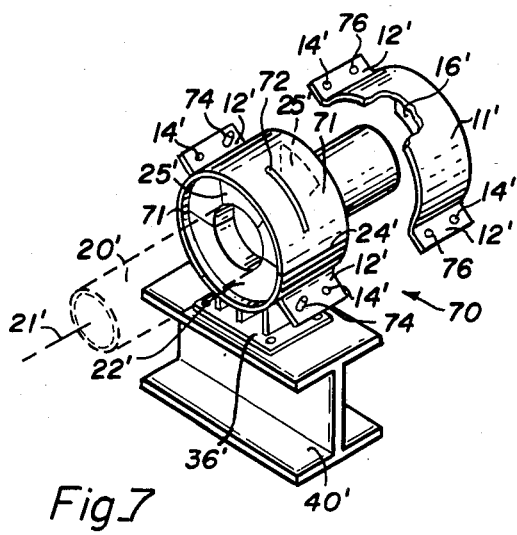
Fig_7
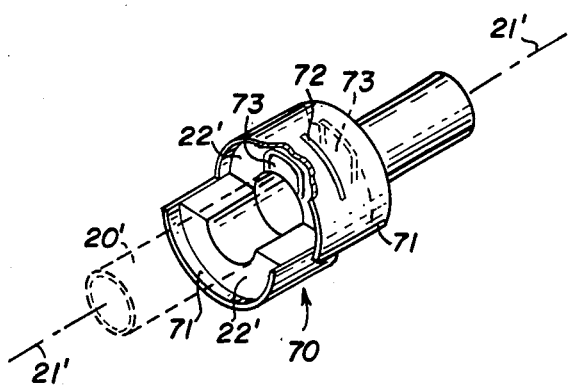
Fig_8
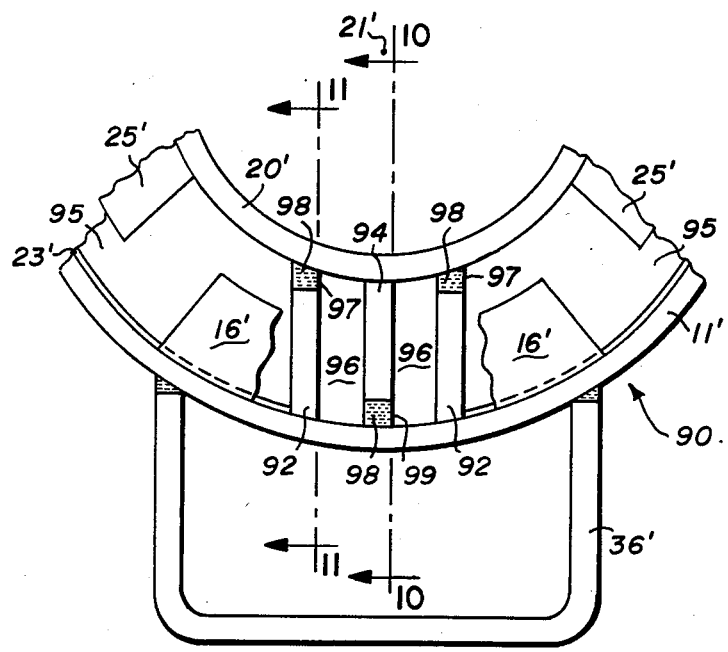
Fig_9
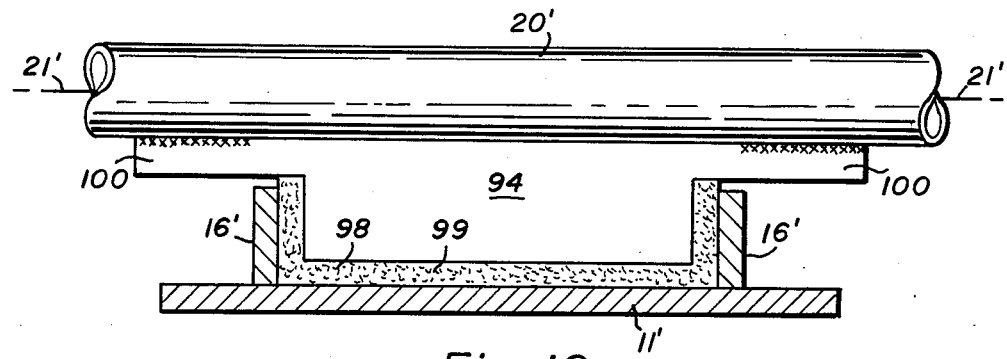
Fig_10

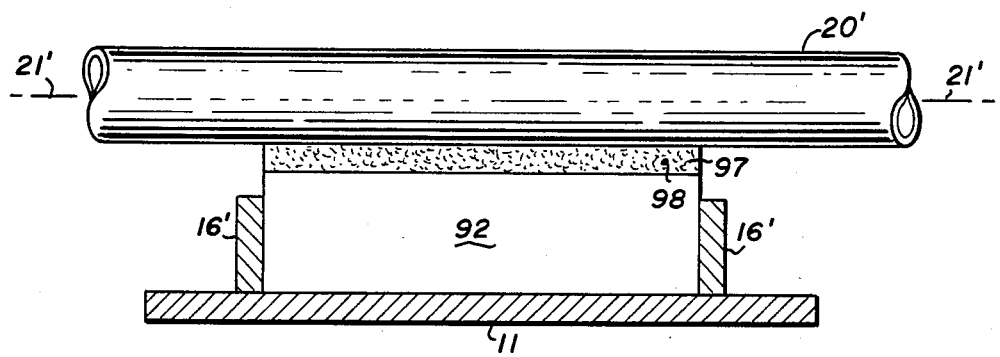
Fig_11
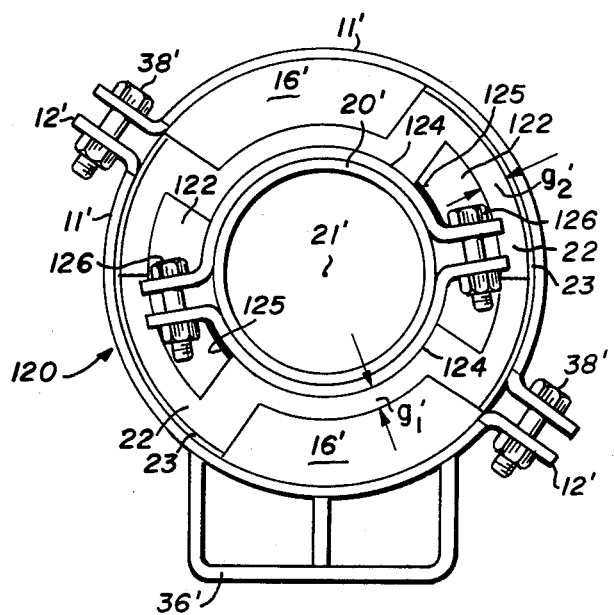
Fig_12

INSULATED PIPE ANCHOR APPARATUS

This is a continuation-in-part of application Ser. No. 875,285, filed on June 17, 1986, now abandoned.

BACKGROUND OF THE INVENTION

1. Field of the Invention

This invention relates generally to a device for supporting elongated structures and more specifically to devices for insulating and anchoring pipes.

2. Description of the Prior Art

In the construction of various types of facilities such as nuclear power plants, oil refineries, petro chemical plants, fossil fuel plants and pulp and paper plants, pipes are used to carry high and low temperature gases and liquids, e.g. steam or chilled water. In the construction of certain types of plants such as nuclear power plants, these pipes are subject to certain seismic requirements promulgated by governmental agencies to ensure that the pipes will remain intact during possible natural disasters, such as earthquakes. As is well documented in the State of California, failure to meet such seismic requirements for earthquake conditions can delay the opening of nuclear power plants for months causing tremendous cost over runs as well as other problems. For these and other reasons, it is often desirable to anchor pipes such that no axial, lateral or vertical movement of the pipe is possible at a fixed point.

Additionally, the marked increase in energy costs has caused end users of the aforementioned facilities to consider carefully their energy requirements before building a pipe line. Construction of pipe lines in the industries mentioned herein typically involves the use of many pipe supports. These pipe supports are a primary focal point of energy conservation because of the heat loss at each support. If the pipe support is not insulated, energy costs are greatly increased. For example, if fluid in the pipe is nine hundred degrees Fahrenheit (900° F.) a typical T-clamp support would be at seven hundred degrees Fahrenheit (700° F.). As can be appreciated, large amounts of energy are wasted heating the support. Such energy losses are further magnified by environmental conditions such as cold temperatures and wind factors. Thus, in addition to the requirement that a pipe support firmly anchors the pipe to a fixed point, it is also desirable that the anchoring apparatus be insulated so as to prevent heating or cooling of the anchoring apparatus.

In addition, under humid conditions, pipes handling chilled water are subject to condensation sweating with resultant damage to the pipe insulation as well as to the building and/or equipment adjacent to the pipe.

As a solution to the insulation problem, an insulating pipe support was disclosed in McClellan, U.S. Pat. No. 4,323,088 (hereinafter "McClellan '088"). The McClellan '088 pipe support includes the use of alternating inserts, of insulating material and insulating load bearing material and is designed primarily for use with small diameter pipes.

Another patent, McClellan, U.S. Pat. No. 4,530,478 (hereinafter "McClellan '478"), discloses an apparatus for providing insulating pipe support to large diameter pipes. An additional feature of McClellan '478 is the presence of a hollowed based structure having a surface which mates with the rack surface on which the pipe support rested. This hollowed base surface is designed to provide the minimum amount of friction contact between the base and rack surface thereby allowing longitudinal pipe movement in response to expansion of the pipe caused by heating or cooling.

None of the prior art devices utilized for supporting and insulating pipes address the problem of restraining axial, lateral and vertical pipe movement.

SUMMARY OF THE PRESENT INVENTION

It is therefore an object of the present invention to provide an insulated pipe anchoring device which is capable of providing positive restrain to pipe movement in the axial, lateral and vertical directions, in addition to insulating the pipe from the environment and the supporting structure and which also provides adequate support for the pipe.

Briefly, a preferred embodiment of the present invention includes an insulated pipe anchor apparatus comprised of a two piece external frame, a two piece internal insulating structural insert and a plurality of thrust plates which are attached to the external frame and to a pipe to be anchored in such a manner that they straddle the structural insert and provide positive restraint to axial, lateral and vertical pipe movement. Generally, one piece of the external frame is attached to a section of supporting structural steel by welding, bolting or other means, so as to provide a stationary anchoring point. Thrust plates are welded to the pieces of the external frame such that they tend to enclose the open face of the cylinder formed when the two pieces of the external frame are placed together. Spaces are left between adjacent thrust plates so as to create gaps where additional thrust plates are inserted. The structural insert is manufactured from a single type of material designed to both support the pipe and insulate the pipe at the point of support. Preferentially, this material is high density, high strength calcium silicate, but other materials can be used. The structural insert comprises two roughly symmetrical semicylindrical pieces designed to slide around the pipe to be anchored and fit snugly inside the external frame. After the two pieces of the external frame have been secured around the structural insert, the additional thrust plates are welded to the pipe to be anchored such that they fit into the spaces intermediate the first thrust plates.

An advantage of the present invention is that it provides positive restraint to pipe movement in the axial, lateral and vertical directions, plus insulating the pipe from the environment and the supporting structure.

A further advantage of the present invention is that the thrust plates which are secured to the pipe to be anchored, can be manufactured from a material which is suitable for welding to the pipe.

Another advantage of the present invention is that there is no direct or continuous heat path from the pipe to the external frame.

Another advantage of the present invention is that there is minimal possibility of experiencing shear failure in the structural insert material.

These and other objects and advantages of the present invention will no doubt become obvious to those of ordinary skill in the art after having read the following detailed description of the preferred embdiments which are illustrated in the various figures of the drawing.

IN THE DRAWING

FIG. 1 is a perspective view of a preferred embodiment of an insulated pipe anchor apparatus of the present invention shown in a partially disassembled condition;

FIG. 2 is a perspective view of a partially assembled and installed insulated pipe anchor apparatus of FIG. 1 showing the two pieces of the insulating structural insert;

FIG. 3 is an end elevational view of the assembled insulated pipe anchor apparatus of FIG. 1;

FIG. 4 is a perspective view of the embodiment of FIG. 3 shown as assembled and installed in a typical application;

FIG. 4A is a perspective view of an alternative embodiment of the insulated pipe anchor apparatus of FIG. 1;

FIG. 5 is an end elevational view of an alternative embodiment of an insulated pipe anchor apparatus of the present invention;

FIG. 5(a) is a cross-sectional view of the insulated pipe anchor apparatus and support system taken along the line 5a—5a of FIG. 5;

FIG. 6 is a perspective, partially-exploded view of an alternative embodiment of an insulating pipe anchor apparatus of the present invention;

FIG. 7 is a perspective, partially-exploded partially-sectioned view of an alternative embodiment of an insulated pipe anchor apparatus of the present invention;

FIG. 8 is a perspective, partially-sectioned view of a partially assembled insulated pipe anchor apparatus of FIG. 7;

FIG. 9 is a partial end elevational view of an alternative embodiment of an insulated pipe anchor apparatus of the present invention;

FIG. 10 is an enlarged cross-sectional view of the embodiment of FIG. 9 taken along the line 10—10 of FIG. 9;

FIG. 11 is an enlarged cross-sectional view of the embodiment of FIG. 9 taken along the line 11—11 of FIG. 9; and FIG. 12 is an end elevational view of an alternative embodiment of an insulated pipe anchor apparatus of the present invention.

DETAILED DESCRIPTION OF THE PREFERRED EMBODIMENT

FIG. 1 illustrates an insulated pipe anchor apparatus of the present invention and referred to by the general reference character 10. The apparatus 10 provides support, insulation and positive restraint to pipe movement in the axial, lateral and vertical directions to pipe lines carrying gases or liquids.

The apparatus 10 includes a cylindrical external frame comprising two semicylindrical frame straps 11 having clamp ears 12 at each end. The clamp ears 12 extend radially outward from frame straps 11 and contain holes 14. Also attached to each frame strap 11 are two flat arcuate thrust plates 16 of a width "w" and a radian length "$d_1$". The thrust plates 16 are arcuate and attached near the central end of each frame strap 11. Thrust plates 16 are positioned such that they are parallel to each other and project inward and normal to the strap 11. The thrust plates 16 are recessed from the axial end edge of the straps 11 such that a space 18 exists along the rim of the frame strap. The thrust plates 16 are curved to fit snugly into the curve of frame strap 11. Thus, the radius of the outer edge of plates 16 coincide with the inner radius of straps 11. Also, the dimension $d_1$ of thrust plates 16 is chosen such that a space 19 exhists intermediate the arcuate end of the plate 16 and the arcuate end of the strap 11.

Fitting inside the assembled frame straps 11 and around a pipe 20 having an axis of rotation 21, is an arcuate insulating structural insert 22. As shown in FIG. 2, the insulating structural insert 22 comprises two symmetrical semicylindrical pieces which are coaxial with the axis 21. The outer radius of the inserts 22 coincide with the inner radius of the straps 11 so that the inserts 22 fit snugly and concentrically around pipe 20 and into the cradle formed by frame strap 11 and thrust plates 16. The two, one hundred and eighty degrees (180°) pieces of the insulating structural insert 22 are each developed circumferentially in a one hundred and eighty degree (180°) shim 23 of sheet metal. When assembled, the interference of the two insulating structural inserts 22 form a plane 24 projecting radially while the clamp ears 12 are at a plane projecting radially and offset at an angle "a" relative to the plane 24 as shown in FIG. 2 and FIG. 3. The angle "a", as shown, is approximately forty-five degrees (45°). Four arcuate thrust plates 25 are each welded to the pipe 20 after the external frame 11 and insulating structural insert 22 have been assembled. The thrust plates 25 fit into the spaces 19 intermediate the thrust plates 16. The radian length of the plates 24 may also be "$d_1$" and of width "w".

FIG. 3 is an end elevation view of the assembled insulated pipe anchor apparatus 10 illustrating the relationship of thrust plates 16 to the thrust plates 25 welded to the pipe 20. As illustrated in FIG. 3, thrust plates 16 provide a radial clearance gap 30 of width $g_1$ between the pipe 20 and the inside radius edge of the thrust plate 16. The thrust plates 25 are designed so as to provide a radial clearance gap 32 of width $g_2$ between the frame strap 11 and the outside radius edge of the thrust plate 25. In addition, both the thrust plates 16 and thrust plates 25 are made so as to result in clearances 34 extending between the terminal ends of any two thrust plates. Also shown in FIG. 3 is a base plate 36 which is welded to one of the frame straps 11 and two bolts 38 used to clamp the two frame straps 11 to each other and around the shims 23.

FIG. 4 shows the insulated pipe anchor apparatus 10 installed in a typical application. In this application, the insulated pipe anchor apparatus 10 has been welded to a structural support beam 40 through base plate 36.

FIG. 4A shows an embodiment of the present invention, designated by the general reference numeral 42, in which two of the thrust plates 16, from FIG. 1, have been replaced by a pair of thrust plates 44. The elements of embodiment 42 that are common to the elements of apparatus 10, are designated by the same reference character followed by a prime designation. The thrust plates 44, one attached to each of the frame straps 11', have been rotated from the position occupied by the replaced thrust plate 16 of FIG. 1. Thus, in FIG. 4A, each of the frame straps 11' contain the thrust plate 16' situated on one face of frame strap 11' and the thrust plate 44 situated on the opposite face of the frame strap 11', offset from thrust plate 16' so that the thrust plates 16' and 44 do not eclipse each other. The new positions of thrust plates 44 dictate that the thrust plates 25' to be attached to the pipe 21' such that they fit into a pair of spaces 46 adjacent to thrust plates 44 and a pair of spaces 48 adjacent to the thrust plates 16'.

In the preferred embodiment, primarily designed for use on horizontal pipe supported from below, the external frame straps 11 and thrust plates 16 are made of carbon steel. The thrust plates 16 may be welded to the straps 11 at the manufacturing facility. Additionally, a formed base plate 36 is welded to one of the frame straps 11 so as to provide an element that can be welded to a piece of supporting structural steel, thus providing the anchoring location for the insulated pipe anchor apparatus 10 as shown in FIG. 4. When the two pieces of the external frame 11 are clamped together with bolts 38 through holes 14, the external frame serves as a source of positive restraint to any lateral and vertical forces transmitted through the insulating structural insert 22. The thrust plates 16 are designed to snugly straddle the insulating structural inserts 22, thus providing a source of positive restraint to axial pipe movement transmitted to the frame through the inserts 22. The thrust plates 25 are supplied loose from the frame straps 11 so that they may be welded in the field to the pipe 20 when the insulated pipe anchor apparatus 10 is assembled in the field. The thrust plates 25 also provide a source of positive restraint to axial pipe movement by transmitting axial forces from the pipe 20 to the structural insert 22 which is restrained by the frame straps 11 and thrust plates 16. The thrust plates 25 may be made of a material compatible with the pipe to which they will be welded so as to avoid the deleterious effects associated with welding to dissimilar materials.

The configuration of thrust plates 16 and 25, as shown in FIG. 3, with corresponding radial clearance gaps 30 and 32, may be chosen so as to ensure that there is no direct or continuous heat path from the pipe 20 to the external frame straps 11. This configuration thus maintains the integrity of the structural insert 22 as an insulating device. The configuration of thrust plates 16 and 25 further ensures that there is a minimal possibility of experiencing shear failure in the structural insert material 22. In the alternative embodiment shown in FIG. 4A, the possibility of shear failure can be totally eliminated by off-setting a pair of thrust plates 16' and 44 on each of the frame straps 11' so that the axial forces transmitted by the insulating structural insert would be in a state of pure compression.

The insulating structural insert 22 functions to both support the load of the pipe 20 and to insulate the pipe at the point of support. In the preferred embodiment, high density, high strength calcium silicate is used as the insulating structural insert material for insert 22. This material is strong enough and sufficiently resistant to high temperature conditions so that when the thrust plates 25 are field welded in place, no special precautions need be taken to protect the integrity of the material. The structural inserts 22 are covered along their circumferences by the sheet metal shims 23. Shims 23 both maintain the form of the structural insert and ensure that the structural insert 22 material is protected from water intrusion. As shown in FIG. 2, when the structural insert 22 is assembled, the angle "a" is approximately forty-five degrees (45°). This configuration ensures that water intrusion will not occur through the clamp ear joint. After the insulated pipe anchor apparatus 10 has been assembled, pipe insulation may be positioned into the space 18, in FIG. 1, which was designed for this purpose. When properly installed in this manner, the pipe insulation jacket will protect the face of the structural insert 22 from water intrusion. Additional protection for the structural insert can be achieved by coating the structural insert 22 with a waterproof material. The clamp ears 12 have been contoured, as shown in FIG. 1, to provide installation clearance for the pipe insulation jacketing.

FIG. 5 illustrates an alternate embodiment of the present invention, primarily designed for use on horizontal pipe which is supported on rod hangers, and is referred to by the general reference character 50. The elements of embodiment 50 that are common to the elements of apparatus 10, are designated by the same reference character followed by a prime designation.

The apparatus 50 is similar to the apparatus 10 except for the presence of two U-shaped lugs 52 and the absence of base plate 36. One lug 52 is attached to each frame strap 11' and projects laterally. A pair of vertical structural steel support members 55 straddle each U-shaped lug 52 providing for minimal axial clearance $g_3$ as illustrated in FIG. 5A. The lugs 52 can slide freely vertically and/or horizontally between structural steel support members 55, each pair of which are tied together by horizontal structural steel support member 54. The apparatus 50 is usually supported on a rod hanger 56. The result of this method of attachment is that apparatus 50 provides positive restraint against axial pipe movement but permits limited vertical and lateral movement of the apparatus 50 relative to the structural support 54/55. Thus, the pipe 20' has axial restraint relative to the apparatus 50, but the entire apparatus 50 may move laterally and/or vertically relative to the support 54/55.

FIG. 6 illustrates another embodiment, primarily designed for use on vertical pipe, of the present invention and is referred to by the general reference character 60. The elements of embodiment 60 that are identical to the elements of the apparatus 10 are designated by the same reference character followed by a prime designation.

The apparatus 60 is similar to the apparatus 10 except that thrust plates 16 and 25 have been replaced by a pair of thrust plates 64 and 66, respectively, in FIG. 6. Thrust plates 64 are arcuate plates having an outer edge radius equal to the inner surface radius of the strap 11' and a width "$w_2$" which is less than the width of the insert 22'. The plates 64 are attached near the edges of external frame straps 11' so as to abut structural inserts 22', but only on one side of the cylinder formed by the assembled frame straps 11'. Thrust plates 66 are arcuate plates having an inner edge radius equal to the outer surface radius of the pipe 22 and a width "$w_2$". Plates 66 are attached to the pipe 20' on the opposite face of the cylinder formed by the assembled frame strap 11' and also abut structural insert 22'. Additional holes 68 exist in clamp ears 12'.

The apparatus 60 is useful in situations where the load to be handled by the pipe anchoring apparatus 60 is unidirectional. In the case of a downward load, the thrust plates 64 would be prewelded to strap 11' on the cylinder face on the lower side of the assembly, while the thrust plates 66 would be field welded to the pipe 20' on the cylinder face on the upper side of the assembly.

FIG. 7 illustrates an alternative embodiment of the present invention and is referred to by the general reference character 70. The elements of embodiment 70 that are identical to the elements of the preferred embodiment 10 shown in FIG. 1 are designated by the same character followed by a prime designation.

The apparatus 70 is similar to the apparatus 10 except the external frame 11' includes a single thrust plate 16' and the sheet metal shim 23 of FIG. 1 is replaced by a similar sheet metal shim 71 which extends beyond the frame strap 11'. Additionally, in apparatus 70, only two thrust plates 25' are used. A slot 72 is cut into shim 71 and extends into the structural insert 22'. Both faces of the structural insert 22' containing the slot 72 also contain recesses 73 for accepting thrust plates 25' as shown in FIG. 8.

In apparatus 70, clamp ears 12' have the additional features of an aligning pin 74 on the clamp ears of one strap 11' and holes 76 on the clamp ears of the other strap 11' for accepting aligning pins 74.

Apparatus 70 is useful in applications where the structural insert material is not capable of surviving the temperatures accompanying the field welding of the thrust plates 25'. In this application, the thrust plates 25' are welded to the pipe 20' prior to assembly of apparatus 70. The structural insert 22' is then placed over the thrust plates 25' and the frame straps 11' are assembled around the structural insert 22' with the thrust plate 16' fitted into slot 72. Aligning pins 74 prevent movement of the top strap 11' relative to the bottom strap 11'.

FIG. 9 illustrates an alternative embodiment of the present invention designed to restrain rotational pipe motion in addition to axial, lateral and vertical pipe motion and is referred to by the general reference character 90. The elements of embodiment 90 which are common to the elements of apparatus 10 are designated by the same reference character followed by a prime designation.

The apparatus 90 is similar to the apparatus 10 except for the presence of additional thrust plates 92 and 94 which are attached to the frame strap 11' and the pipe 20' respectively. The thrust plates 92 and 94 extend longitudinally substantially parallell to the pipe axis 21' and to each other. Additionally, the insulating structural insert 22 in apparatus 10 is replaced by a plurality of similar insulating structural inserts 95 which terminate at plates 92. Sandwiched between plates 92 and 94 are additional insulating structural inserts 96. A gap 97 exists between each thrust plate 92 and the pipe 20'. Gap 97 is filled with a packing material 98. Another gap, 99, exists between thrust plate 94 and frame strap 11'. Gap 99 is also filled with the packing material 98.

FIGS. 10 and 11 illustrate the shape and location of thrust plates 94 and 92 respectively. Plate 92 may be welded to strap 11' at the place of manufacture. Plate 94 has a flared edge 100 at each end so that it may be field welded to pipe 20' along the flared edges 100 as shown in FIG. 10.

The packing material 98 can be comprised of ceramic fiber of mineral wool as well as other materials. If the pipe 20' tends to rotate in either direction, the plate 94 tends to place force against the insert 96 which is restrained by the plate 92 which is secured to the straps 11'. Likewise, if the straps 11' tended to rotate, the plates 92 would place the inserts 96 in compression which are restrained by the plate 94 secure to the pipe 20.

FIG. 12 illustrates an alternate embodiment of the present invention referred to by the general reference character 120 which eliminates the requirement for field welding thrust plates to a pipe to be anchored. The elements of embodiment 120 that are similar to the elements of apparatus 10 are designated by the same character followed by a prime designation.

The apparatus 120 is similar to the apparatus 20 except that the thrust plates 25 of apparatus 10 are replaced by thrust plates 122 which are welded to semicylindrical clamp pieces 124 at the location 125. Bolts 126 fasten the two clamp pieces together around pipe 20 at opposite lateral ends of the inserts 22.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An insulated pipe anchoring apparatus comprising:
a frame comprising two semicylindrical frame pieces, each of the frame pieces having clamp means at each end for accepting a fastener whereby, when the pieces are fastened together a hollow cylinder is formed;
an internal insulating structural insert comprising two arcuate pieces which fit snugly within said hollow cylinder and for fitting snugly and concentrically around a pipe to be anchored, the insert being of a thermally insulating and strong compression resistant material;
a first plurality of thrust plates, each of the first plates being attached near an edge of the frame and parallel to the open face of the cylinder formed with said frame pieces are fastened together, with a radial space being left between and two of the first thrust plates situated adjacent to each other on the same cylinder face and each of the first plurality of thrust plates abutting an axial end of at least one of the structural inserts; and
a second plurality of thrust plates, each of the second plates being attached to the pipe to be anchored, parallel to the open faces of the cylindrical frame and fitting into said radial spaces intermediate to the first plates and each of the second plurality of thrust plates abutting an axial end of at least one of the structural inserts;
whereby compression of the structural insert provides positive restraint against lateral, axial or vertical movement of said pipe relative to the external frame.

2. The apparatus of claim 1 further including,
a base plate with the frame firmly attached to the base plate.

3. The apparatus of claim 2 wherein,
the frame is attached to a structural support beam through the base plate; and
whereby no movement of the apparatus relative to said structural support beam is possible.

4. The apparatus of claim 1 including,
a first radial clearance gap between the pipe and the inside radius of the first thrust plates, a second radial clearance gap between the frame and the outside radius of the second thrust plates and clearance gaps between the interfaces of said first and said second thrust plates.

5. The apparatus of claim 1 wherein,
the first thrust plates are welded to the frame and the second thrust plates are supplied separately for attachment to the pipe to be anchored.

6. The apparatus of claim 5 wherein,
the second thrust plates are of a material compatible for welding to the pipe.

7. The apparatus of claim 1 wherein, the insulating structural insert is a high density, high strength calcium silicate.

8. The apparatus of claim 1 wherein,
the insulating structural insert is circumferentially enveloped with a sheet metal shim.

9. The apparatus of claim 1 further including,
an arcuate shim positioned over the outer radial surface of each of the structural inserts and adjacent to the inner radial surface of the frame.

10. The apparatus of claim 1 wherein,
the intersection of the said frame pieces is radially offset from the intersection of said two pieces of structural insert.

11. The apparatus of claim 1 wherein,
a radial gap exists between each of the first plurality of thrust plates and each of the second plurality of thrust plates.

12. The apparatus of claim 1 further including,
two lugs, each lug being attached to a separate piece of the frame and projecting from the frame.

13. The apparatus of claim 12 further including,
a frame comprised of two vertical guide posts, with each guide post comprising a pair of structural steel support members which straddle one of the lugs with an axial clearance gap being left between the lug and each support member and the support members being joined by a horizontal support member;
whereby limited vertical and lateral movement of the apparatus relative to said structural steel support members is possible.

14. The apparatus of claim 1 further including,
an arcuate shim positioned over the outer radial surface of each of the structural inserts, adjacent to the inner radial surface of the frame but extending axially beyond the end of the frame;
a slot cut into one of the arcuate shims and underlying structural insert; and
an aligning pin attached to each clamp means;
whereby the aligning pins properly position the frame around the structural insert with the first thrust plate inserted through the slot and into the structural insert.

15. An insulated pipe anchoring apparatus comprising:
a frame comprising two semicylindrical frame pieces, each of the frame pieces having clamp means at each end for accepting a fastener whereby, when the pieces are fastened together a hollow cylinder is formed;
an internal insulating structural insert comprising two arcuate pieces which fit snugly within said hollow cylinder and for fitting snugly and concentrically around a pipe to be anchored, the insert being of a thermally insulating and strong compression resistant material, with the intersection of the two arcuate pieces being radially offset from the intersection of the two frame pieces;
a first plurality of thrust plates, each of the first plates being attached near an edge of the frame and parallel to the open face of the cylinder formed when said frame pieces are fastened together, with a radial space being left between any two of the first thrust plates situated adjacent to each other on the same cylinder face and each of the first plurality of thrust plates abutting an axial end of at least one of the structural inserts;
a second plurality of thrust plates, each of the second plates being attached to the pipe to be anchored, parallel to the open faces of the cylindrical frame and fitting into said radial spaces intermediate to the first plates and each of the second plurality of thrust plates abutting an axial end of at least one of the structural inserts;
a radial gap existing between each of the first plurality of thrust plates and each of the second plurality of thrust plates;
whereby compression of the structural insert provides positive restraint against lateral, axial or vertical movement of said pipe relative to the external frame.

16. The apparatus of claim 15 including,
a first radial clearance gap between the pipe and the inside radius of the first thrust plates, a second radial gap between the frame and the outside radius of the second thrust plates, and clearance gaps between the interfaces of said first and second thrust plates.

17. The apparatus of claim 16 wherein,
the first thrust plates are welded to the frame and the second thrust plates comprise a material compatible for welding to the pipe.

18. The apparatus of claim 17 further including,
an arcuate shim positioned over the outer radial surface of each of the structural inserts and adjacent to the inner radial surface of the frame.

19. The apparatus of claim 18 wherein,
the insulating structural insert is a high density, high strength calcium silicate.

20. The apparatus of claim 15 further including,
a base plate with the frame firmly attached to the base plate.

21. The apparatus of claim 15 wherein,
the frame is attached to a structural support beam through the base plate,
whereby no movement of the apparatus relative to said structural support beam is possible.

22. The apparatus of claim 15 wherein,
the insulating structural insert is circumferentially enveloped with a sheet metal shim.

23. An insulating pipe anchoring apparatus comprising:
a frame comprising two semicylindrical frame pieces having clamp means for accepting fasteners at each end whereby, when the two pieces are fastened together, a hollow cylinder is formed;
an internal insulating structural insert comprising two semicylindrical pieces which fit snugly within said hollow cylindrical and for fitting snugly and concentrically around a pipe to be anchored, the insert being of a thermally insulating and strong compression resistant material;
a first plurality of thrust plates having a width $w_2$, each of the first plates being attached near an edge of the frame and parallel to the open face of the cylinder formed with said frame pieces are fastened together, the first plates being attached near only one face of said cylinder and each of the first plurality of thrust plates abutting an axial end of at least one of the structural inserts;
a second plurality of thrust plates, each of the second plates being attached to the pipe to be anchored, parallel to the open faces of the cylindrical frame and being attached near the opposite cylinder face from which the first plates are near and the second plurality of thrust plates having a width $w_2$ such that there would be overlap of the second plurality of thrust plates with the first plurality of thrust plates if they were on the same cylinder face and each of the second plurality of thrust plates abutting an axial end of at least one of the structural inserts;

whereby compression of the structural insert provides positive restraint against lateral, axial or vertical movement of said pipe relative to the external frame.

24. An insulating pipe anchoring apparatus comprising:

a frame comprising two semicylindrical frame pieces having clamp means for accepting fasteners at each end whereby, when the two pieces are fastened together a hollow cylinder is formed;

an internal insulating structural insert comprising a plurality of pieces which fit snugly within said hollow cylinder and for fitting snugly and concentrically around a pipe to be anchored, the insert being of a thermally insulating and strong compression resistant material;

a first plurality of thrust plates, each of the first plates being attached near an edge of the frame and parallel to the open face of the cylinder formed when said two frame pieces are fastened together, with a radial space intermediate any two of the first thrust plates situated adjacent to each other on the same cylinder face and each of the first plurality of thrust plates abutting an axial end of at least one of the structural inserts;

a second plurality of thrust plates, each of the second plates being attached to the pipe to be anchored, parallel to the open faces of the cylindrical external frame and fitting into said radial spaces intermediate to the first plates and each of the second plurality of thrust plates abutting an axial end of at least one of the structural inserts;

a third plurality of thrust plates, each of the third plates being attached to the frame, parallel to said pipe and between two thrust plates of the first plurality and having a gap between the third thrust plates and said pipe;

a fourth thrust plate attached to said pipe parallel to the pipe and between two thrust plates of the first plurality and having gaps between fourth thrust plates and both the frame and thrust plates of the first plurality such that if the pipe rotates, at least one piece of the internal insulating structural insert is compressed between the fourth thrust plate and at least one of the third plurality of thrust plates;

a packing material in gaps between thrust plates of the third plurality and four type;

whereby compression of the structural insert provides positive restraing against rotational, latereal, axial or vertical movement of said pipe relative to the external frame.

25. An insulated pipe anchoring apparatus comprising:

a frame comprising two semicylindrical frame pieces having clamp means for accepting fasteners at each end whereby, when the two pieces are fastened together a hollow cylinder is formed;

an internal insulating structural insert comprising two semicylindrical pieces which fit snugly within said hollow cylinder and for fitting snugly and concentrically around a pipe to be anchored, the insert being of a thermally insulating and strong compression resistant material;

a first plurality of thrust plates, each of the first plates being attached near an edge of the external frame and parallel to the open face of the cylinder formed when said two frame pieces are fastened together, with a radial space being left between any two of the first thrust plates situated adjacent to each other on the same cylinder face and each of the first plurality of thrust plates abutting an axial end of at least one of the structural inserts;

a second plurality of thrust plates, each of the second plates being attached to a semicylindrical clamp piece which fits around said pipe, the second plates being parallel to the open faces of the cylindrical frame and fitting into said radial spaces intermediate to the first plates and each of the second plurality of thrust plates abutting an axial end of at least one of the structural inserts;

whereby compression of the structural insert provides positive restraint against lateral, axial or vertical movement of said pipe relative to the frame.

26. An insulated pipe anchoring apparatus comprising:

a frame comprising two semicylindrical frame pieces, each of the frame pieces having clamp means at each end for accepting a fastener whereby, when the pieces are fastened together a hollow cylinder is formed having a first open face and a second open face;

an internal insulating structural insert comprising two arcuate pieces which fit snugly within said hollow cylinder and for fitting snugly and concentrically around a pipe to be anchored, the insert being of a thermally insulating and strong compression resistant material;

a first plurality of thrust plates, each of the first plates being attached near an edge of the frame and parallel to the first open face or the second open face, with a radial space being left between any two of the first thrust plates situated adjacent to each other on the same cylinder face and each of the first plurality of thrust plates abutting an axial end of at least one of the structural inserts such that no first plurality thrust plate on the first open face eclipes a first plurality thrust plate on the second open face; and a second plurality of thrust plates, each of the second plates being attached to the pipe to be anchored, parallel to the open faces of the cylindrical frame and fitting into said radial spaces intermediate to the first plates and each of the second plurality of thrust plates abutting an axial end of at least one of the structural inserts;

whereby compression of the structural insert provides positive restraint against lateral, axial or vertical movement of said pipe relative to the external frame.

* * * * *